Oct. 9, 1945. H. E. BRANNON 2,386,426
ELECTRIC BROILER
Filed July 11, 1940 2 Sheets-Sheet 1
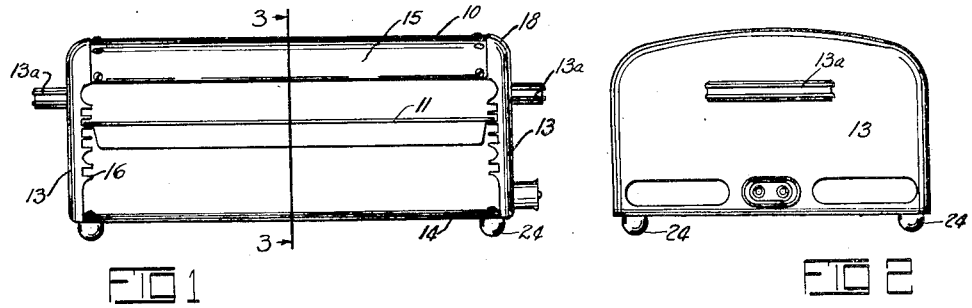
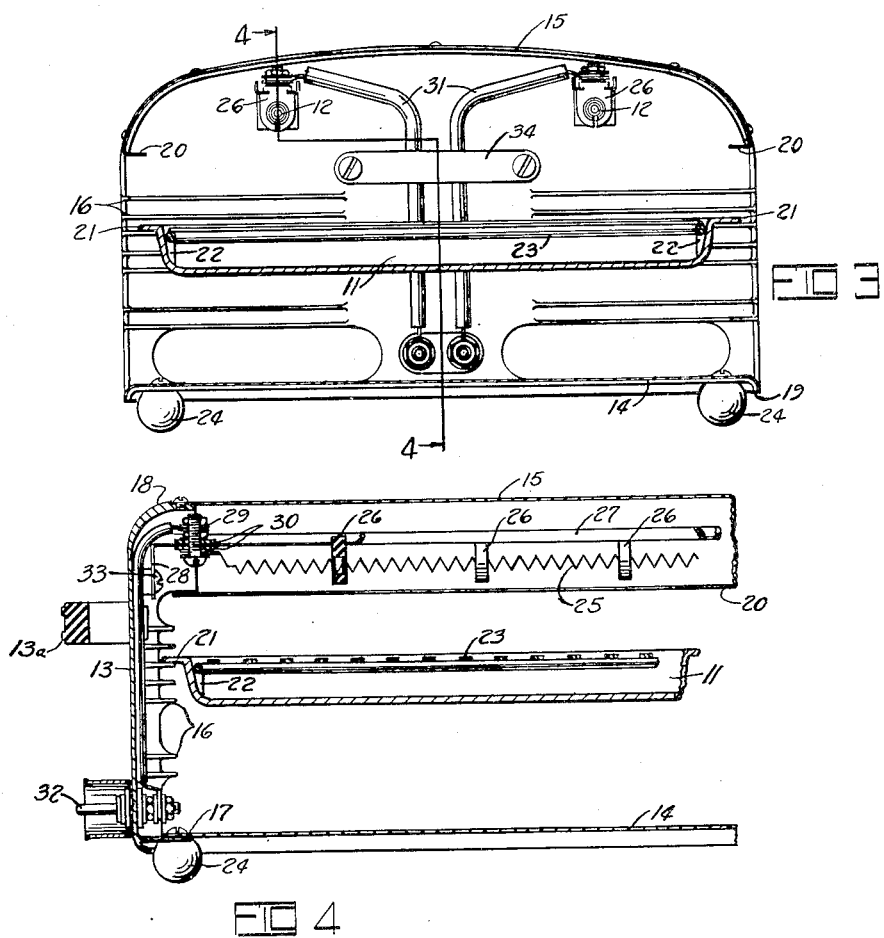
INVENTOR
HERBERT E. BRANNON.
BY Carroll R. Taber
ATTORNEY Oct. 9, 1945.　　　　H. E. BRANNON　　　　2,386,426
ELECTRIC BROILER
Filed July 11, 1940　　　　2 Sheets-Sheet 2
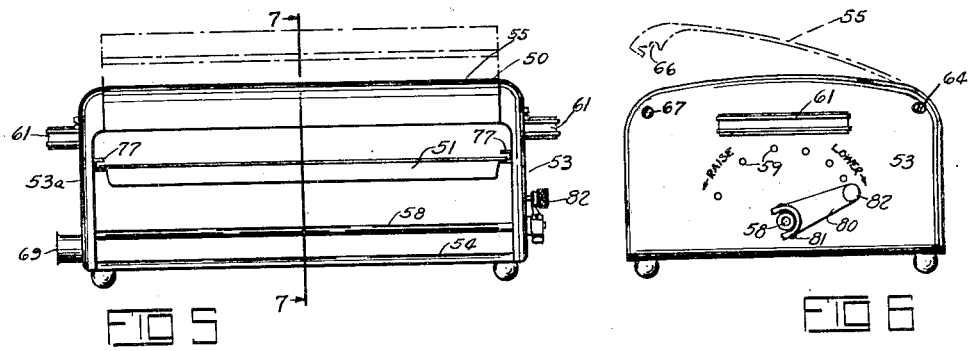
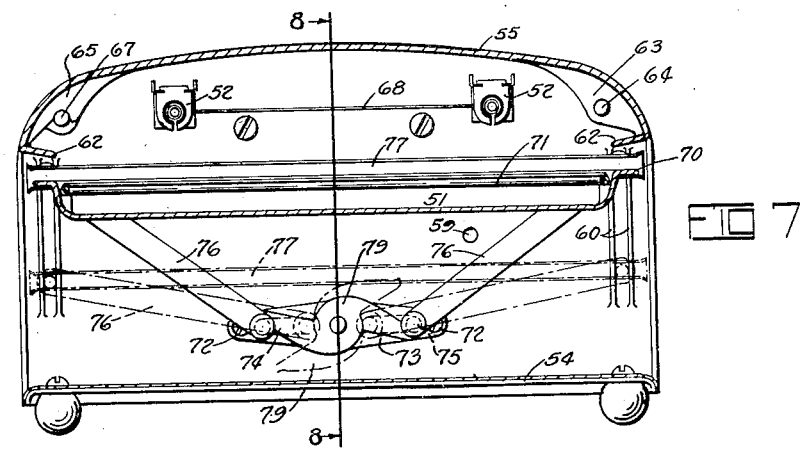
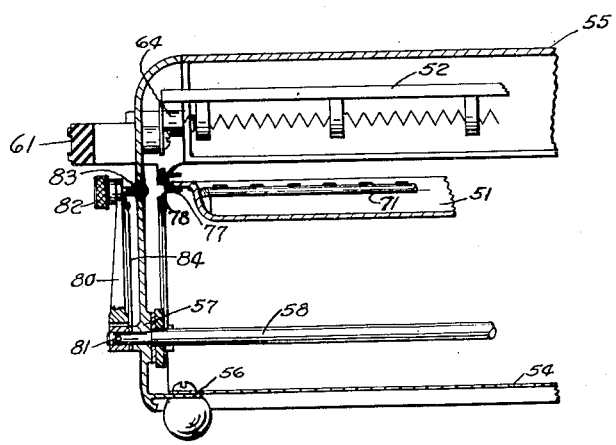
INVENTOR
HERBERT E. BRANNON.
BY *Carroll R. Taber*
ATTORNEY Patented Oct. 9, 1945

2,386,426

UNITED STATES PATENT OFFICE 2,386,426

ELECTRIC BROILER

Herbert E. Brannon, Detroit, Mich.

Application July 11, 1940, Serial No. 344,844

3 Claims. (Cl. 219—19)

This invention relates to electrical cooking appliances, and particularly to individual electrically heated broilers.

The principal object of the invention is to provide an electrically heated broiler that is smokeless in operation. Another object of the invention is to provide such a broiler in which the top wall is hinged to make the interior readily accessible. Still another object is to provide a broiler in which the food supporting platter is movable vertically relative to the heating element. A further object of the invention is the provision of novel mechanism for supporting the platter to permit the latter to be conveniently raised and lowered.

These objects will more fully appear in the following specification when read in connection with the accompanying drawings, wherein—

Figure 1 is a side elevational view of one embodiment of the invention;

Figure 2 is an end elevational view of the same;

Figure 3 is a cross-sectional view taken on substantially the line 3—3 of Figure 1;

Figure 4 is a fragmentary cross-sectional view taken on substantially the line 4—4 of Figure 3;

Figure 5 is a side elevational view of a modified form of the invention;

Figure 6 is an end view of the same;

Figure 7 is a cross-sectional view taken on substantially the line 7—7 of Figure 5;

Figure 8 is a fragmentary cross-sectional view taken on substantially the line 8—8 of Figure 7.

Referring now more in detail to the drawings, Figures 1 to 4 illustrate a broiler which constitutes a preferred embodiment of the invention.

The broiler comprises generally a shell 10, a platter 11 and a pair of heating element assemblies 12.

The shell consists of a pair of upright end walls 13, a bottom wall 14, and a top wall 15. The end walls 13 are preferably aluminum castings, although they may be made of other metals and in other ways. The end walls 13 are provided with a plurality of integral inwardly extending horizontal ribs 16 for supporting and guiding the platter. Adjacent the lower edges of the end walls are inwardly extending flanges 17. Ball shaped feet 24 are attached to the ends of the flanges 17. The upper edges 18 of the end walls 13 are curved upwardly and inwardly both transversely and longitudinally of the broiler. On the outside of the end walls 13 are handles 13a.

The bottom wall 14 is a rectangular sheet of metal, flanged downwardly at its lateral edges 19 for the sake of appearance, and is secured at its ends to the flanges 17 on the end walls 13. Preferably the bottom wall is made of stainless steel, or other non-corrosive metal, and is highly polished on its top surface.

The top wall 15 is a rectangular metal sheet curved to the cross-section shown in Figure 3 and secured to the inturned upper edges 18 of the end walls 13. The lateral edges of the top wall 15 are flanged inwardly at 20. The lateral edges of the top wall 15 are spaced a substantial distance above the bottom wall 19, thus leaving the sides of the broiler open.

The platter 11 is preferably made of a suitable aluminum or magnesium alloy cast into the form of a shallow rectangular dish having a peripheral flange 21 adapted to be mounted on ribs 16. Preferably the upright walls of the tray are provided with integral lugs 22 upon which a grid 23 is supported. The grid 23 may be of any suitable construction.

Each heating element assembly 12 comprises a helical resistance element 25 mounted in suitable refractory insulators 26 secured to a channel shaped metal support 27. The support 27 has formed at each end a depending flange 28. The flanges 28 are secured to the end walls 13 by screws 33. Terminal screws 29 are mounted upon the support 27 and insulated therefrom by means of mica washers 30. Each screw 29 is connected to the adjacent end of the resistance element 25 and to a lead in wire 31 which extends downward to a terminal 32 adapted to receive a conventional connecting plug and cord. The lead in wires 31 are covered with insulating material and are held against movement by straps 34 screwed to the end walls 13.

The heating element assemblies 12 are located adjacent the top wall 15 and at a level above the flanges 20.

In a general way the operation of the invention is self-evident. The broiler is connected to a source of current by a conventional cord and plug and the current turned on. The food that is to be broiled or toasted is placed upon the grid 23 within the platter, or the grid may be removed and the food placed directly on the platter. The platter is located at the correct height relative to the heating elements by placing it on the corresponding ribs 16. When the food has been properly cooked the platter is withdrawn.

Due to the convex shape of the top and the fact that the sides of the broiler are open, no smoke will issue from the broiler. Plenty of air for complete combustion of all combustible gases is supplied through the open sides of the broiler. All such gases rise into the space below the top, where in the presence of sufficient air and under the influence of the heat from the heating elements they will be completely consumed. If any partly consumed gases which would cause smoke tend to escape before being completely burned they will strike the flanges 20 and be deflected inwardly to again rise into the top of the broiler.

The curved top wall 15 concentrates the heat from the heating elements upon the food being cooked, thereby promoting efficient operation of the broiler. Furthermore, when foods are placed on grid 23, a certain amount of heat is absorbed by the exposed portions of platter 11. Due to its fast heat conducting qualities the platter distributes the absorbed heat and reflects or radiates said heat to the underside of food thereby partially cooking that side. When broiling is done without grid 23, and food being broiled is placed directly on the bottom of platter 11 a certain amount of heat is also absorbed by the exposed portions of the platter and is rapidly distributed over the bottom surface of platter 11. In that case the heat is imparted by direct contact to the underside of the food being broiled.

The modified form of the invention shown in Figures 5 to 8 embodies the same principles as the previously described device. However, it is somewhat more convenient to use because of the facility with which the platter may be adjusted.

The construction illustrated in these figures comprises a shell 50, a platter 51, raising and lowering mechanism therefor, a pair of heating element assemblies 52.

The shell 50 consists of a pair of upright end walls 53 and 53a, a bottom wall 54, and a top wall 55. The end walls 53 and 53a preferably are castings having flanges 56 adjacent their lower edges upon which the bottom wall 54 is supported. The end walls have bosses 57 thereon drilled to provide bearings for a shaft 58. A plurality of spaced holes 59 are drilled in the end wall 53 concentric with the bearing for shaft 58.

Both end walls are provided with two pairs of spaced apart vertical ribs 60 which form a pair of vertical grooves adjacent the opposite sides of the end walls. The purpose of these grooves will appear presently.

Both end walls 53 and 53a have handles 61 for carrying the broiler.

The top wall 55 is of curved cross-section similar to top wall 15 in the previously described device. At its lateral edges are inturned flanges 62. At each end of the top wall and adjacent one lateral edge thereof is a depending vertical flange 63 which is drilled to receive a hinge pintle 64. The hinge pintles 64 are secured to the walls 53 and 53a. The top wall is thus pivotally mounted on the end walls so that it may be raised as indicated in dotted lines in Figures 5 and 6. Another pair of flanges 65 are provided adjacent the opposite side of the top wall. Those flanges 65 are notched at 66 to receive a stop pin 67 upon which the top wall rests when in its closed position. The stop pins 67 are affixed to the end walls.

The two heating element assemblies 52 are similar to the assemblies 12 previously described and are mounted on the end walls 53 and 53a in a similar manner. The two assemblies are connected in series at one end by a wire 68. The other ends are connected to terminals 69 on the wall 53a in a manner similar to the heating element assemblies 12.

The platter 51 is the same as platter 11 and is provided with a peripheral flange 70. Within the platter is a grid 71.

The platter 51 is slidably supported in a pair of channels 77 within the broiler. The channels 77 are carried by adjusting mechanism which provides for vertical movement of the platter. The adjusting mechanism will now be described.

Secured to each end wall 53 and 53a by screws 72 is a guide bar 73. The guide bar 73 has a horizontal slot 74 therein at each side of its center. A roller 75 is mounted for reciprocatory movement in each slot and each roller is rotatably mounted at one end of a thrust link 76.

The other end of each thrust link 76 is pivoted to one end of the web of the adjacent channel 77. Each thrust link also carries a roller 78 on its side opposite the channel. The roller is mounted in the guide groove formed by the ribs 60 described previously.

Rigidly connected adjacent the ends of the shaft 58 inwardly of the end walls 53 and 53a are two cams 79 shaped as shown in Figure 7. The cams are arranged to operate against the rollers 75, forcing the latter apart when the cams are rotated in one direction while permitting them to approach each other when the cams are rotated in the opposite direction. When the cams 79 are rotated to force the rollers 75 apart, the thrust links 76 move the rollers 78. The movement of the latter is constrained to an upward direction by the guide ribs 60. Thus the channel 77 is moved upward with the rollers 78 and the upper ends of the thrust links 76. This motion is depicted in Figure 7, the initial position of the elements when the channel 77 is lowered being shown in broken lines, while the final or raised position is shown in full lines.

In order to conveniently rotate the shaft 58 and thereby cause the above described movement, a handle 80 is provided. The handle 80 is located at one extremity of the shaft 58 outside of the end wall 53. The handle is forked at one end and is pivotally connected to the shaft by a pintle 81 so that it may be rotated toward or away from the end wall 53 but is prevented from rotation about the axis of the shaft.

The other end of handle 80 has a knob 82 on its outer face and a pin 83 projecting from its inner face. The pin is adapted to enter any one of the holes 59 in the end wall 53 to latch the handle in its various positions of rotation. The pin 83 is released by pulling outward on knob 82, swinging handle 80 about pintle 81. The handle can thus be rotated. Upon reaching the desired position the pin is inserted in the nearest hole 59. A spring 84 maintains the handle and pin 83 in its latched position.

Except for the adjustment of the particular adjusting mechanism above described, the operation of the structure shown in Figures 5 to 8 is the same as the construction illustrated in Figures 1 to 4. The curved top wall and open sides prevent smoke when the invention is in use. Furthermore, the adjusting mechanism provides for ready manipulation of the height of the platter for broiling or toasting at different speeds. Also, the hinged top makes the interior readily accessible as well as permitting the operator to easily inspect the broiler's contents at any time.

The scope of the invention is indicated in the appended claims.

I claim:

1. Electrically heated cooking apparatus including a shell comprising a top wall having a concave lower face, a bottom wall, and end walls connecting the top and bottom walls, said shell having fully open sides, the width of the top and end walls being substantially the same as that of the bottom wall, an electric heating element mounted in said shell within the cavity formed by the concave face of said top wall, a platter, and means on said shell supporting said platter within said shell below said heating element, said means being vertically adjustable within said shell.

2. Electrically heated cooking apparatus including a shell comprising a top wall having a concave lower face, a bottom wall and end walls connecting the top and bottom walls, said shell having fully open sides, the width of the top and end walls being substantially the same as that of the bottom wall, an electrical heating element mounted in said shell within the cavity formed by the concave face of said top wall, and a platter element within the shell below the heating element, one of said elements being movable vertically relative to the other element.

3. Electrically heated cooking apparatus including a shell comprising a top wall having a concave lower face, a bottom wall, and end walls connecting the top and bottom walls, said shell having fully open sides, the side edges of said top wall having inturned substantially horizontal flanges thereon spaced a substantial distance above the bottom wall, and an electrical heating element mounted in said shell within the cavity formed by the concave face of said top wall.

HERBERT E. BRANNON.